US012573949B2

(12) United States Patent
Hu et al.

(10) Patent No.: US 12,573,949 B2
(45) Date of Patent: Mar. 10, 2026

(54) CURRENT LIMITER FOR A CHARGE PUMP REGULATOR

(71) Applicants: NEXPERIA B.V, Nijmegen (NL); Nexperia Technology (Shanghai) Ltd., Shanghai (CN)

(72) Inventors: Zhicheng Hu, Shenzhen (CN); Wei Wan, Guangzhou (CN)

(73) Assignees: Nexperia B.V., Nijmegen (NL); Nexperia Technology (Shanghai) Ltd., Shanghai (CN)

(*) Notice: Subject to any disclaimer, the term of this patent is extended or adjusted under 35 U.S.C. 154(b) by 1 day.

(21) Appl. No.: 18/673,737

(22) Filed: May 24, 2024

(65) Prior Publication Data

US 2024/0396445 A1      Nov. 28, 2024

(30) Foreign Application Priority Data

May 24, 2023      (EP) .................................... 23175046

(51) Int. Cl.
H02M 3/07 (2006.01)
(52) U.S. Cl.
CPC .................................... H02M 3/07 (2013.01)
(58) Field of Classification Search
None
See application file for complete search history.

(56) References Cited

U.S. PATENT DOCUMENTS

| | | | | | |
|---|---|---|---|---|---|
| 5,392,205 | A | * | 2/1995 | Zavaleta ................. | H02M 3/07 |
| | | | | | 363/59 |
| 5,559,687 | A | * | 9/1996 | Nicollini ................. | H02M 3/07 |
| | | | | | 363/60 |
| 5,680,300 | A | * | 10/1997 | Szepesi ................... | H02M 3/07 |
| | | | | | 363/59 |
| 6,400,203 | B1 | * | 6/2002 | Bezzi ................. | H03K 17/0822 |
| | | | | | 327/309 |
| 7,535,281 | B2 | * | 5/2009 | Olsen ...................... | H02M 3/07 |
| | | | | | 363/59 |
| 10,243,548 | B2 | * | 3/2019 | Ramalingam ........... | H02M 3/07 |
| 10,333,393 | B2 | * | 6/2019 | Salem ...................... | H02M 3/07 |
| 11,411,490 | B2 | * | 8/2022 | Walter .................... | H02M 3/07 |
| 2008/0031078 | A1 | * | 2/2008 | Kang ....................... | G11C 8/10 |
| | | | | | 365/189.11 |

(Continued)

*Primary Examiner* — Thomas J. Hiltunen
(74) *Attorney, Agent, or Firm* — Ruggiero McAllister & McMahon LLC

(57) ABSTRACT

A current limiter and a charge pump regulator including the current limiter are provided. The charge pump regulator converts an input voltage to an output voltage and includes a feedback loop including a first transistor for regulating a discharge current from the charge pump regulator. The current limiter limits the current provided by the charge pump regulator. The current limiter includes a sampling block configured to sample a first drain-source voltage of the first transistor and hold it as a reference drain-source voltage; an adaptive tracking block configured to receive the reference drain-source voltage, and to generate a maximum voltage based on the reference drain-source voltage, so that the maximum voltage tracks the reference drain-source voltage; and a voltage clamp block configured to clamp a feedback voltage to the maximum voltage, and to provide the clamped voltage as a first gate-source voltage of the first transistor.

15 Claims, 7 Drawing Sheets

200

202

(56)                    References Cited

U.S. PATENT DOCUMENTS

| 2009/0128212 A1* | 5/2009 | Liu | H02M 3/07 |
| | | | 327/291 |
| 2011/0148510 A1* | 6/2011 | Dhuyvetter | H02M 3/07 |
| | | | 327/536 |

* cited by examiner

CURRENT LIMITER FOR A CHARGE PUMP REGULATOR

CROSS-REFERENCE TO RELATED APPLICATIONS

This application claims the benefit under 35 U.S.C. § 119 (a) of European Patent Application No. 23175046.4 filed May 24, 2023, the contents of which are incorporated by reference herein in their entirety.

BACKGROUND

1. Field of the Disclosure

The present disclosure relates to a current limiter for a charge pump regulator. In particular, it relates to a current limiter configured to clamping a feedback voltage with an adaptive maximum voltage.

2. Description of the Related Art

A charge pump, or charge pump regulator, is a kind of switching regulator that provides an output voltage based on a received input voltage, by charging and discharging capacitors. A typical charge pump may be composed of a switched-capacitor array, which may be used to realize a voltage conversion from a supply/input voltage Vin to an output voltage Vout. When no feedback mechanism is present, the output voltage Vout may be approximately equal to K*Vin, wherein K is a property of the specific switched-capacitor array. Commonly used values for K include K=2 for a doubler (2×), K=3 for a tripler (3×), or K=−1 for an inverter (−1×). For a regulated charge pump, a feedback loop may be added to obtain a precise, set value for Vout, even when the value of the supply voltage Vin varies. This may for example include Vout=5V for a Vin in a range from 2.7V to 4V. A traditional current mode regulation may for be achieved by operating a regulation transistor (a MOSFET transistor) as a controlled current source. The current regulation may be achieved by adding the regulation transistor to a discharge current path. The feedback loop may also comprise an error amplifier, which may provide an output that adjusts the discharge current for different Vin/Vout voltage and load conditions.

An existing problem for charge pump regulators is that the current limit threshold may vary a lot at different Vin/Vout conditions. This may present a problem in setups where the value of Vin or Vout set value may vary significantly. In smartphone and/or tablet computer applications, a wide Vin/Vout range support is required. When using a charge pump regulator, an accurate current limit threshold may help the regulated charge pump keep the same current capability when Vin/Vout changes. When the load current is lower than this current limit threshold, output voltage Vout remains regulated with a small ripple voltage. However, when the load current is higher than this threshold, the output voltage Vout voltage may lose regulation, and large voltage ripple will be observed. Therefore, it is desirable to keep the load current below the current limit threshold to maintain stable operation of a charge pump regulator.

In an example application, an LCD panel display system of smartphone or tablet is provided. In the panel display, a regulated positive voltage rail and a negative voltage rail may be required for tuning the display effect. For the negative voltage rail, a charge pump regulator may be used and implemented for example in a display bias integrated circuit IC. To avoid large current damages the internal devices, a current limit function may be desirable. An accurate current limit threshold may help to better protect internal devices.

It is an object of the present disclosure to overcome or mitigate one or more problems associated with the prior art.

SUMMARY

According to a first aspect of the present disclosure, there is a current limiter for a charge pump regulator. The charge pump regulator is for converting an input voltage Vin to an output voltage Vout. The charge pump regulator comprises a feedback loop comprising a first transistor M0 for regulating a discharge current Idis from the charge pump regulator. The current limiter is configured to limit the current provided by the charge pump regulator. The current limiter comprises a sampling block configured to sample a first drain-source voltage Vds of the first transistor M0 and hold it as a reference drain-source voltage Vds_ref, the current limiter further comprises an adaptive tracking block configured to receive the reference drain-source voltage Vds_ref and to generate a maximum voltage Vmax based on the reference drain-source voltage Vdsref, such that the maximum voltage Vmax tracks the reference drain-source voltage Vds_ref. The current limiter also comprises a voltage clamp block configured to clamp a feedback voltage Vcomp to the maximum voltage Vmax, and to provide the clamped voltage as a first gate-source voltage Vgs of the first transistor M0.

Optionally, the adaptive tracking block may comprise a sense transistor Ms connected to a sense amplifier AMP1 and connected to a reference current Iref_max, wherein the sense amplifier AMP1 and the reference current Iref_max may be configured to clamp the drain-source voltage Vds_sns of the sense transistor Ms to the reference drain-source voltage Vds_ref.

Optionally, a current limit Ilim output by the charge pump regulator may be based on a size ratio of the sensing transistor Ms and the first transistor M0.

Optionally, the voltage clamp block may comprise a clamp amplifier AMP2 and a clamp transistor M1 configured to receive the feedback voltage Vcomp and the maximum voltage Vmax, to clamp output the feedback voltage Vcomp clamped to the maximum voltage Vmax.

Optionally, the input voltage may be in a range from 2.7 V to 4.4 V.

Optionally, the charge pump regulator may be one of a doubler charge pump, a tripler charge pump, or an inverter charge pump.

Optionally, the output voltage Vout may be a set value in a range from −10V to +10V.

According to another aspect of the disclosure there is provided a charge pump regulator for converting an input voltage Vin to an output voltage Vout. The charge pump regulator comprises a switched-capacitor array configured to receive the input voltage and convert it to the output voltage. The charge pump regulator further comprises an oscillator comprising a first clock signal and a second clock signal, wherein the first and second clock signals do not overlap and are configured to control the switched-capacitor array by generating a charge phase and a discharge phase. The charge pump regulator also comprises a feedback loop comprising a resistor divider, an error amplifier EA and a first transistor M0. The charge pump regulator further comprises a current limiter as described above.

Features of different aspects of the disclosure may be combined together.

BRIEF DESCRIPTION OF THE DRAWINGS

Embodiments of the disclosure will now be described, by way of example only, with reference to the accompanying schematic drawings, in which.

DETAILED DESCRIPTION

Figure 1:
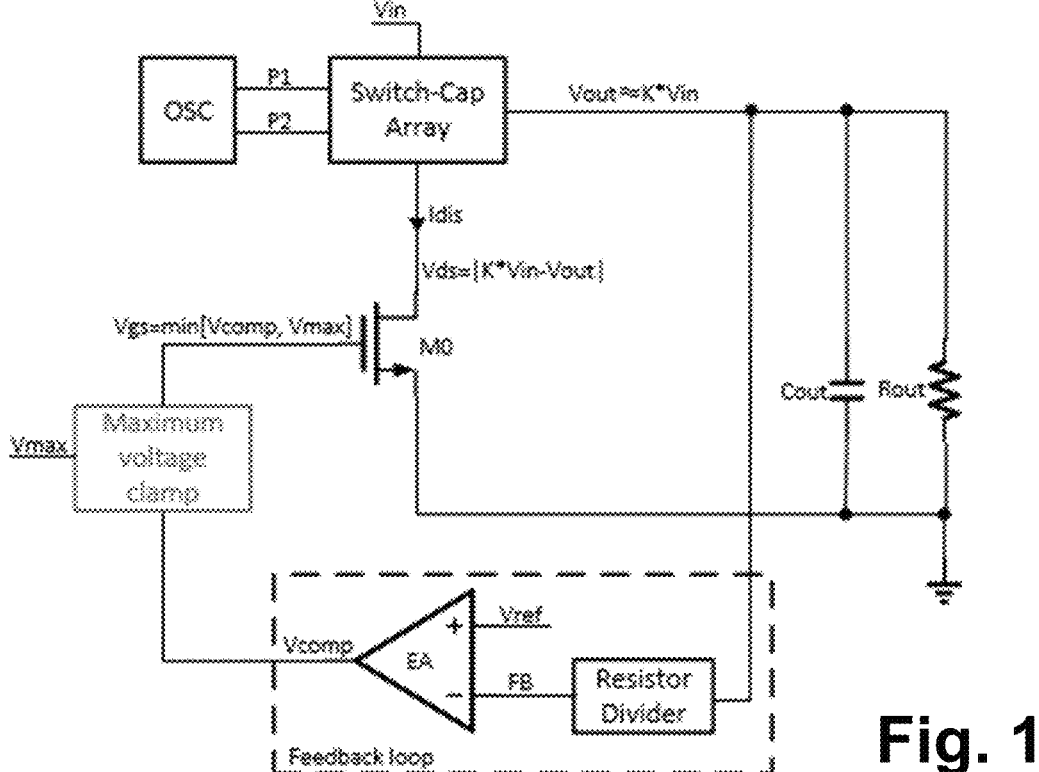
FIG. 1 depicts a schematic circuit diagram of a current limiter and charge pump regulator as known in the art.

FIG. 1 depicts a schematic circuit diagram for a conventional current limit circuit and system for a charge pump regulator. A switched-capacitor array is provided to realize a voltage conversion from a received input voltage Vin to generate an output voltage Vout. When no feedback loop is present, the conversion rate may roughly equal Vout≈ to $K*Vin$, wherein the conversion ratio K is a constant that depends on the design of the switched capacitor array.

Common conversion ratios may include for example a doubler (2×), tripler (3), or inverter (−1×). Other ratios may be achieved as well (e.g. −2×, 1.5×, and the like). In general, a conversion ratio K may be provided, wherein Vout=$K*Vin$. The conversion may be realized by turning parts within the switched capacitor array on and off, alternatively, in a predetermined pattern. The switched capacitor array may be controlled by non-overlapping clock signals P1 and P2, provided by an oscillator OSC. The clock signals may generate charge phases and discharge phases in different portions of the switched capacitor array, according to the desired conversion ratio.

The constant conversion ratio of Vout≈$K*Vin$ may provide a stable conversion in theory. However, in reality, the value of Vin may value within a range of values, leading to a range of output voltage values spanning K8[range of Vin values]. This range of output voltages provided by the charge pump regulator may be undesirable, and instead it is preferred that the charge pump output voltage is regulated (to a more constant value). This regulation may be achieved by having a feedback loop from the output voltage to the switched capacitor array.

To obtain a regulated output voltage Vout, a feedback loop and transistor M0 may be added to the discharge current path to adjust the discharge current Idis. A regulated output voltage may be understood to mean an output voltage that remains stable as the input voltage varies within a range. The transistor may be a MOSFET. For different Vin/Vout ratios, the drain-source voltage Vds of the first transistor voltage M0 may be regulated by the feedback loop to |K*Vin-Vout|. As the value of the input voltage Vin may vary significantly, this resulting Vds may have a large variation as well.

The regulation loop depicted in FIG. 1 includes the feedback loop, which may be composed of a resistor divider and an error amplifier EA. The feedback loop may further comprise the first transistor M0. The resistor divider may sense the output voltage Vout, while the error amplifier EA may amplify a difference between the voltage FB provided by the resistor divider and a reference voltage VREF. The error amplifier may output a feedback voltage Vcomp to adjust discharge current Idis as the feedback loop requires.

The charge pump regulator may have a maximum discharge current Idis_max that the circuit is able to tolerate. Currents exceeding this threshold may for example cause damage to the charge pump regulator, or internal devices. In operation, the charge pump regulator may be connected to a load, having a resistance Rload and drawing a current Iload. In order to avoid damage to the circuit, a current limiter may be provided to the charge pump regulator.

A maximum voltage clamp block may be added to realize a current limit function. When the charge pump amplifier is overloaded (e.g. Rout is very small) or if hard-short occurs, feedback voltage Vcomp may be pulled up by the feedback loop. The maximum voltage clamp block may receive the high Vcomp value and if it is larger than a predetermined maximum voltage Vmax, the maximum voltage clamp block may clamp its output voltage in the feedback loop to a maximum voltage Vmax. The voltage output by the clamp may be provided as a gate-source voltage for the first transistor M0. The maximum discharge current Idis_max for the charge pump regulator may be determined by the values of the maximum voltage Vmax and a drain-source voltage Vds of the first transistor. The current limit threshold Ilim may be Ilim=0.5*Idis_max.

When the drain-source voltage Vds over the first transistor is large, M0 may operate in a saturation region such that: Idis_max=$0.5*Kn*(Vmax-Vth0)^2*(1+\lambda*Vds)$. When the drain-source voltage Vds over the first transistor is small, the first transistor M0 may operates in a linear region, such that: Idis_max=$Kn*[(Vmax-Vth0)*Vds-0.5*Vds^2]$. Vth0 may be a threshold voltage of the first transistor M0. Vth0 may be a material and deficiency-dependent, and may be specific to each particular transistor. Vth0 may vary as a process corner. Kn may be a process parameter, and $\lambda$ may be the channel length modulation coefficient. For an application with a wide Vin/Vout range, Vds=|K*Vin-Vout| may have a large variation, so the current limit threshold Ilim is not accurate, and may also vary significantly with input voltage Vin.

Figure 2:
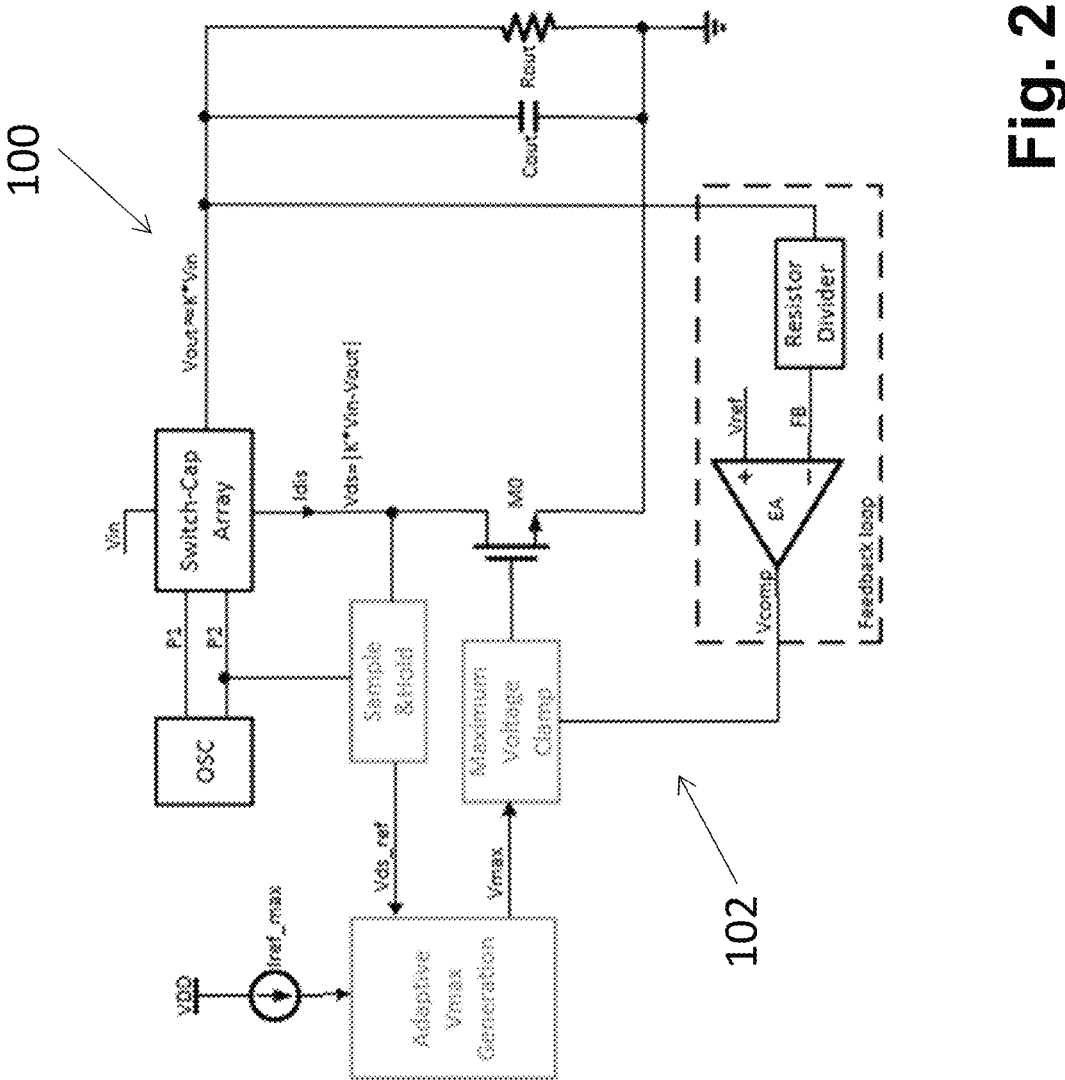
FIG. 2 depicts a schematic circuit diagram of a charge pump regulator with a current limiter according to an example implementation.

It is proposed herein to provide a current limiter for a charge pump regulator that is able to provide an improved accurate current limit, that does not vary based on variations of Vin/Vout. FIG. 2 depicts a schematic circuit diagram of a charge pump regulator with a current limiter. A charge pump regulator 100 is provided in line with the one described in relation to FIG. 1. The charge pump regulator is configured to convert an input voltage Vin to an output voltage Vout, and comprises a feedback loop with a first transistor M0 for regulating a discharge current Idis from the charge pump regulator. A current limiter 102 is provided on the feedback loop to limit the discharge current Idis that can be provided by the charge pump regulator. The current limiter 102 comprises a sampling block (Sample&Hold in FIG. 2) configured to sample a first drain-source voltage Vds of the first transistor M0 and hold it as a reference drain-source voltage Vds_ref. The current limiter further comprises an adaptive tracking block (Adaptive Vmax Generation in FIG. 2) configured to receive the reference drain-source voltage Vds_ref, and to generate a maximum voltage Vmax based on the reference drain-source voltage Vds_ref, such that the maximum voltage Vmax tracks the reference drain-source voltage Vds_ref. The current limiter further comprises a voltage clamp block (Maximum Voltage Clamp in FIG. 2) configured to clamp a feedback voltage Vcomp provided by the feedback loop to the maximum voltage Vmax such that the voltage output by the block is min (Vcomp, Vmax). The voltage clamp further provides its output voltage to the first transistor M0 as a first gate-source voltage Vgs of the first transistor M0. The provision of the tracking maximum voltage Vmax may realize a stable limit to the discharge current Idis when the feedback voltage Vcomp is clamped to Vmax.

An advantage of the current limiter as described in relation to FIG. 2 is that it can apply an accurate current limit threshold to the charge pump regulator 100 for a wide range of Vin/Vout applications. Accurate may be understood to mean that the current limit may have a relatively stable value that is independent or only weakly dependent on variations in the input voltage Vin/Vout. The current limiter may realize an accurate current limit by controlling at least one voltage from the feedback loop to the first transistor. The voltage may be controlled such that it tracks a variation in the ratio between input and output voltages Vin/Vout. The current limiter may achieve an accurate current limit threshold by having the drain-source voltage and the gate-source voltage of the first transistor M0 have a corresponding dependency on the Vin/Vout ratio.

The current limiter 102 may achieve this by sampling the drain-source voltage of the first transistor M0 during a discharge phase to be the reference drain-source voltage Vds_ref. The current limiter then uses this reference drain-source voltage to clamp another voltage so that this can be provided as a maximum voltage for the feedback loop clamp. By making the maximum voltage used in the feedback loop clamp dependent on the drain-source voltage of the first transistor, the dependence on the value of this voltage on Vin/Vout may be removed. This may be because both the drain-source voltage and the gate-source voltage of the first transistor have corresponding dependency on the Vin/Vout ratio (when the feedback loop voltage is clamped to Vmax).

In the charge pump regulator of FIG. 2, output voltage Vout regulation may be realized by the feedback loop. The feedback loop may comprise a resistor divider, an error amplifier EA, and a first transistor M0. The first transistor M0 may be a regulator MOSFET. The drain-source voltage Vds of the first transistor M0 may be regulated by the feedback loop to |K*Vin-Vout|. As mentioned above, this value may have a large variation as the input value may have a large variation (e.g. Vin may vary in a range from 2.7V to 4.4V). An accurate current limit function may be achieved by adding the maximum voltage clamp block, an adaptive tracking block, and a sampling block. The blocks may for example be integrated circuits comprising integrated electronic elements to achieve the functions described. These electronic elements may have known designs and implementations (e.g. operational amplifier, MOSFET transistor, and the like).

The sampling block may sample the drain-source voltage Vds of the first transistor M0 during a discharge phase of clock signal P2. The sampled may be performed during the discharge phase such that the drain-source voltage is at its largest value in the clock charge/discharge cycle. The sampling block may output this sampled voltage as a reference drain-source voltage Vds_ref. The reference drain-source voltage may be provided to the adaptive tracking block. The adaptive tracking block may receive the reference drain-source voltage Vds_ref. The adaptive tracking block may also receive a reference current Iref_max, also referred to as a reference bias current. The reference bias current may be provided by a reference current source. The reference current source may be supplied by a drain power voltage VDD. The adaptive tracking block may use the provided reference drain-source voltage and reference current to generate a maximum voltage Vmax that tracks the reference drain-source voltage Vds_ref according to different Vin/Vout voltages. When an overload or hard-short occurs, a feedback voltage Vcomp may be pulled up by the feedback loop. The voltage clamp block may clamp a high feedback voltage Vcomp to a the maximum voltage Vmax which now tracks variations in Vin-Vout. Therefore, at different Vin/Vout conditions, variation in the drain-source voltage Vds of the first transistor M0 may be large, but they are neutralized as the gate-source voltage Vgs of the first transistor M0 is clamped to a tracking maximum Vmax voltage. As a result, a constant Idis may generated during the discharge phase P2, thereby achieving an accurate current limit threshold Ilim through the circuit topology as provided in FIG. 2.

Figure 3:
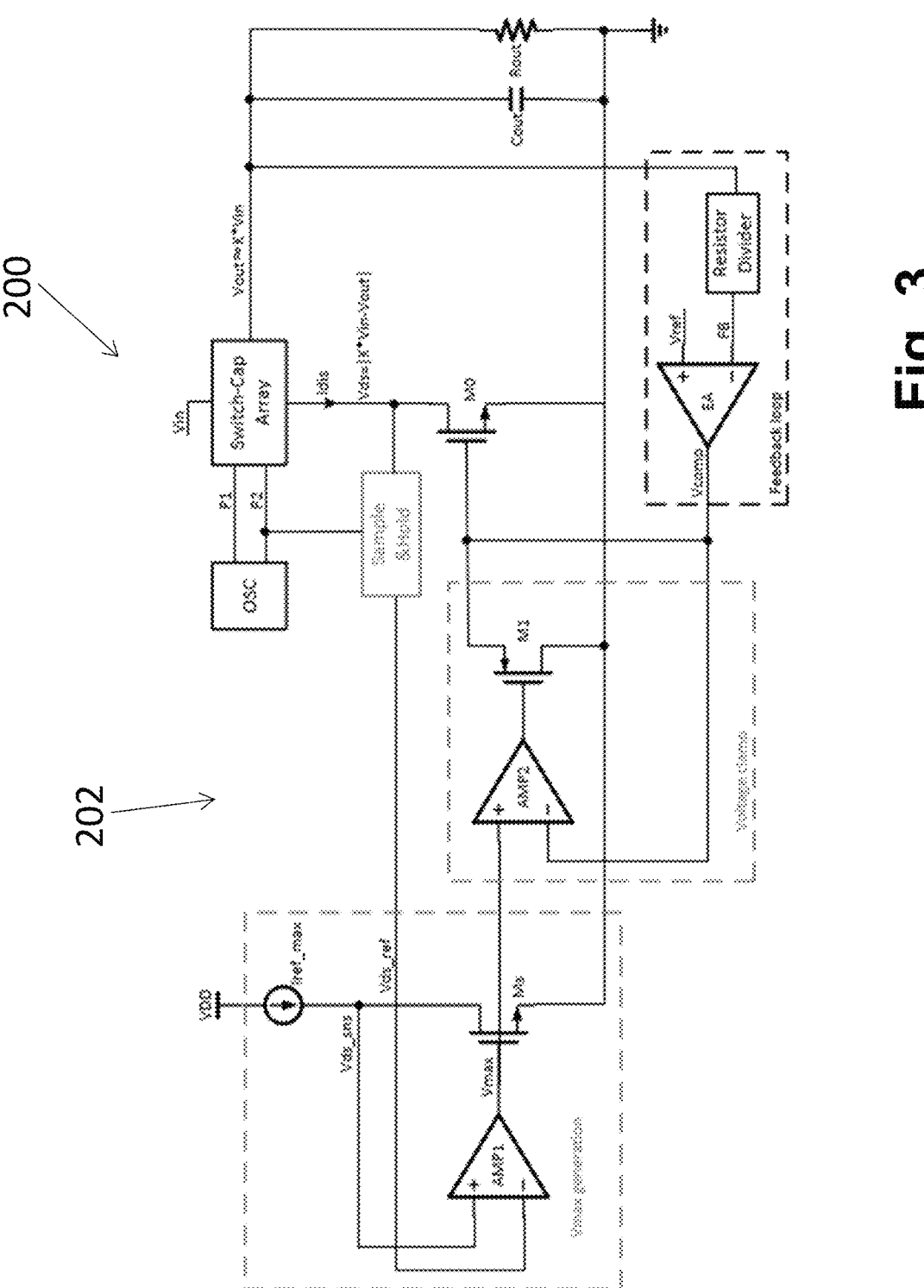
FIG. 3 depicts a schematic circuit diagram of an example charge pump regulator with a current limiter according to an example implementation.

FIG. 3 depicts a schematic circuit diagram of an example implementation of a charge pump regulator 200 with an accurate current limiter 202. The current limiter achieves a current limit function by adding a voltage clamping block, an adaptive tracking block and a sampling block as described in relation to FIG. 2 above. The drain-source voltage voltage Vds of the first transistor M0 may be sampled by the sampling block during a discharge phase of clock signal P2. The sampling block may output a reference drain-source voltage Vds_ref as reference voltage for the sense transistor Ms. The drain-source voltage Vds_sns of the sense transistor Ms may be clamped to Vds_ref using a first amplifier AMP1 and the reference current Iref_max provided in the adaptive tracking block.

When an overload or hard-short of the charge pump regulator occurs, the feedback voltage Vcomp may be pulled up by the feedback loop and clamped to maximum voltage Vmax that tracks the reference drain-source voltage Vds_ref. The voltage clamp block may clamp the feedback voltage using an amplifier AMP2 receiving the feedback voltage Vcomp as negative input and the maximum voltage as positive input. A transistor M1 may be provided to receive the output voltage of AMP2 (min (Vcomp, Vmax)) and transfer it to the gate of first transistor M0.

At different Vin/Vout conditions, the sense transistor Ms and the first transistor M0 have the gate-source voltages having an equivalent relation to the maximum voltage Vgs~Vmax, and the same drain-source voltage Vds=|K Vin-Vout|. As a result, the current limit threshold Ilim is generated as 0.5*Gain*Iref_max, wherein Gain may be the size ratio of the first transistor M0 and the sense transistor Ms. The Gain number has a constant, accurate value, resulting in an accurate current limit threshold, obtained with the circuit topology of FIG. 3.

Figure 4:
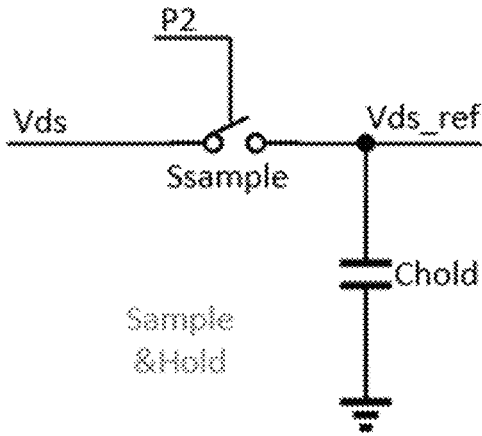
FIG. 4 depicts a circuit diagram of an example sampling block of a current limiter.

FIG. 4 depicts a circuit diagram of an example sampling block (Sample&Hold) of a current limiter 102, 202. The sampling block receives a drain-source voltage Vds of first transistor M0, and a switch Ssample connected to the second clock signal P2. The clock signal P2 operates the switch Ssample such that the drain-source voltage Vds is connected to a hold capacitor Chold during a discharge phase. As the drain-source voltage may also be connected to the second clock signal P2, the voltage Vds loaded onto the hold capacitor Chold may be at be at the same part of the clock each repeat. The hold capacitor may therefore hold the same Vds value which may be takes as Vds_ref. The discharge phase may be the part of the clock phase where Vds has its highest voltage value.

Figure 5:
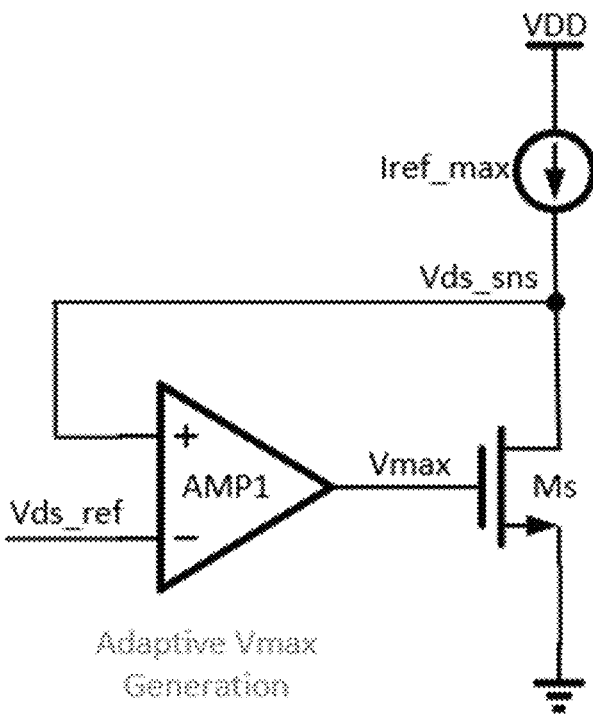
FIG. 5 depicts a circuit diagram of an example adaptive tracking block of a current limiter.

FIG. 5 depicts a circuit diagram of an example adaptive tracking block (Adaptive Vmax Generation) of a current limiter 102, 202. Vds_ref may be received and connected to the negative input of an amplifier AMP1. The output of the amplifier AMP1 may generate the tracking maximum voltage Vmax, and may be connected to a gate of sense transistor Ms. A reference current Iref_max may be provided to a drain of sense transistor Ms. The drain-source voltage Vds_sns may be clamped to the reference drain-source voltage Vds_ref by the amplifier AMP1.

Figure 6:
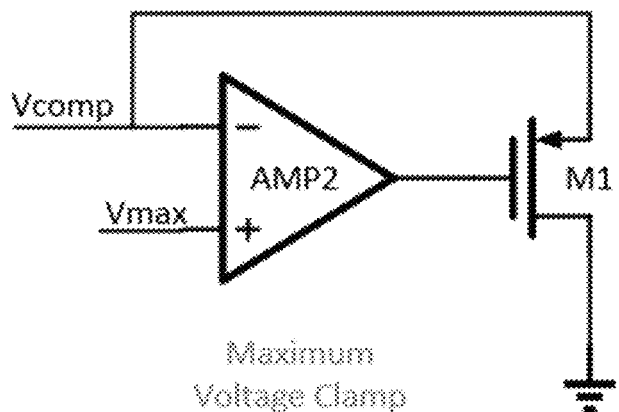
FIG. 6 depicts a circuit diagram of an example voltage clamping block of a current limiter.

FIG. 6 depicts a circuit diagram of an example voltage sampling block (Maximum Voltage Clamp) of a current limiter 102, 202. A feedback voltage Vcomp may be provided to the negative input of an amplifier AMP2. The maximum voltage may be provided to a positive input of amplifier AMP2. The output of amplifier AMP2 may be clamped, via a negative feedback loop, to be the lower value of the feedback voltage and the maximum voltage: min (Vcomp, Vmax). The output voltage of AMPs may be provided to the gate of transistor M1.

Figure 7:
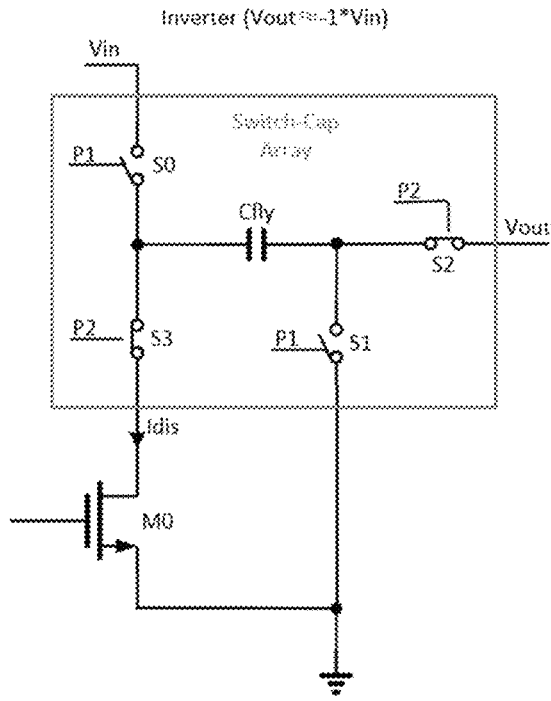
FIG. 7 depicts a circuit diagram of an example switched capacitor array of a charge pump regulator functioning as an inverter (−1×).

FIG. 7 depicts a circuit diagram of an example switched capacitor array of a charge pump regulator 100, 200 functioning as an inverter (−1×). The switch-cap array of an inverter (−1×) may be composed of a capacitor Cfly and switches S0-S3. The switches may be controlled by non-overlapping clock signals P1 and P2. The switches may be implemented as MOSFET, bipolar transistors, and/or diodes. Clock signal P1 may be the charge phase, in which S0/S1 may be on and S2/S3 may be off. Capacitor Cfly may be charged to input voltage Vin. Clock signal P2 may be the discharge phase, in which S0/S1 may be off and S2/S3 may be on. The energy may be transferred as output voltage Vout.

Figure 8:
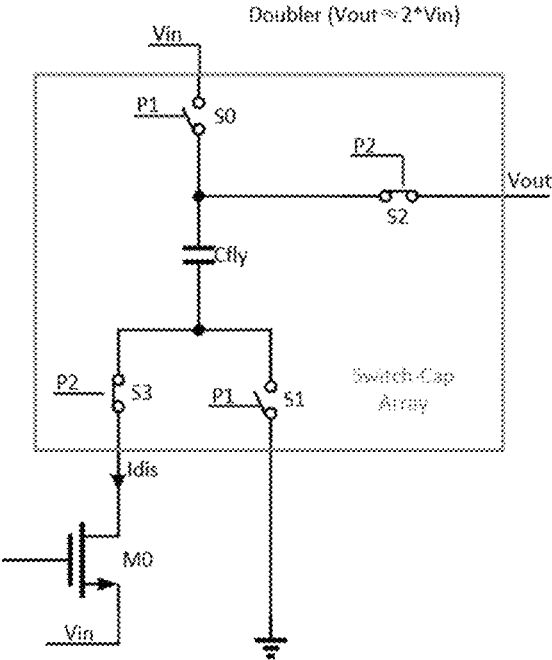
FIG. 8 depicts a circuit diagram of an example switched capacitor array of a charge pump regulator functioning as a doubler (2×).

FIG. 8 depicts a circuit diagram of an example switched capacitor array of a charge pump regulator 100, 200 functioning as a doubler (2×), the array may be composed of capacitor Cfly and switches S0-S3. The switches may be controlled by non-overlapping clock signals P1 and P2. The switches may be implemented as MOSFET, bipolar transistors and/or diodes. P1 may be the charge phase, in which S0/S1 may be on, and S2/S3 may be off. The capacitor Cfly may be charged to input voltage Vin. The clock signal P2 may be the discharge phase, in which S0/S1 may be off and S2/S3 may be on. The energy may be transferred as output voltage Vout.

Figure 9:
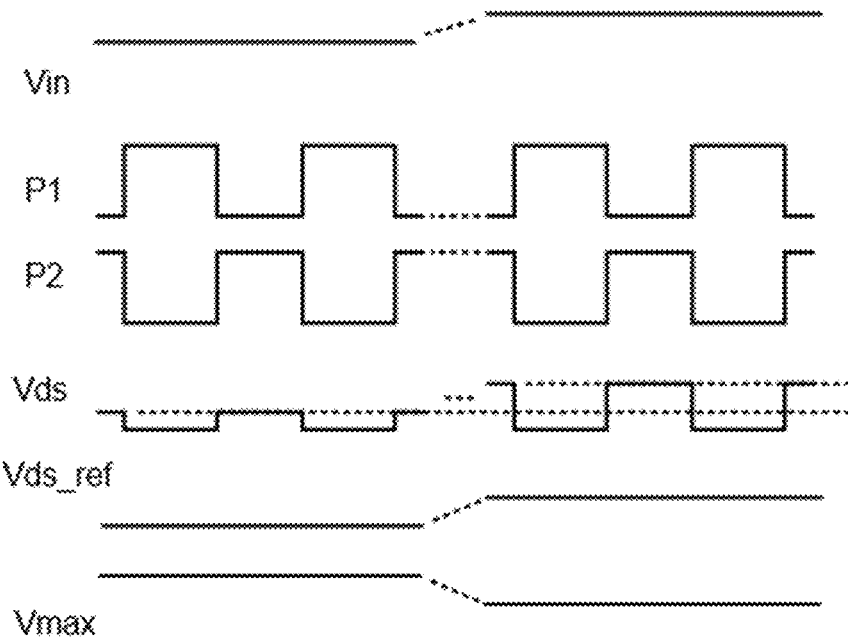
FIG. 9 depicts a schematic waveform for some example voltages in a charge pump resonator.

FIG. 9 depicts a schematic waveform for some example voltages in a charge pump resonator as described in relation to FIGS. 2 and 3. During the second clock phase P2, Vds may be sampled and held to generate the Vds_ref voltage. For a wide Vin/Vout range application, Vds=|K*Vin-Vout| may have a large variation as Vin varies. The adaptive tracking block may receive the Vds_ref voltage and a reference bias current Iref_max to generate a tracking Vmax voltage accordingly. The current limit threshold Ilim may in this way be kept accurate at a set value for different Vin/Vout voltage ratios. As shown in FIG. 9, as the input voltage value varies (increases), the maximum voltage Vmax tracks the reference drain-source voltage Vds_ref.

Figure 10:
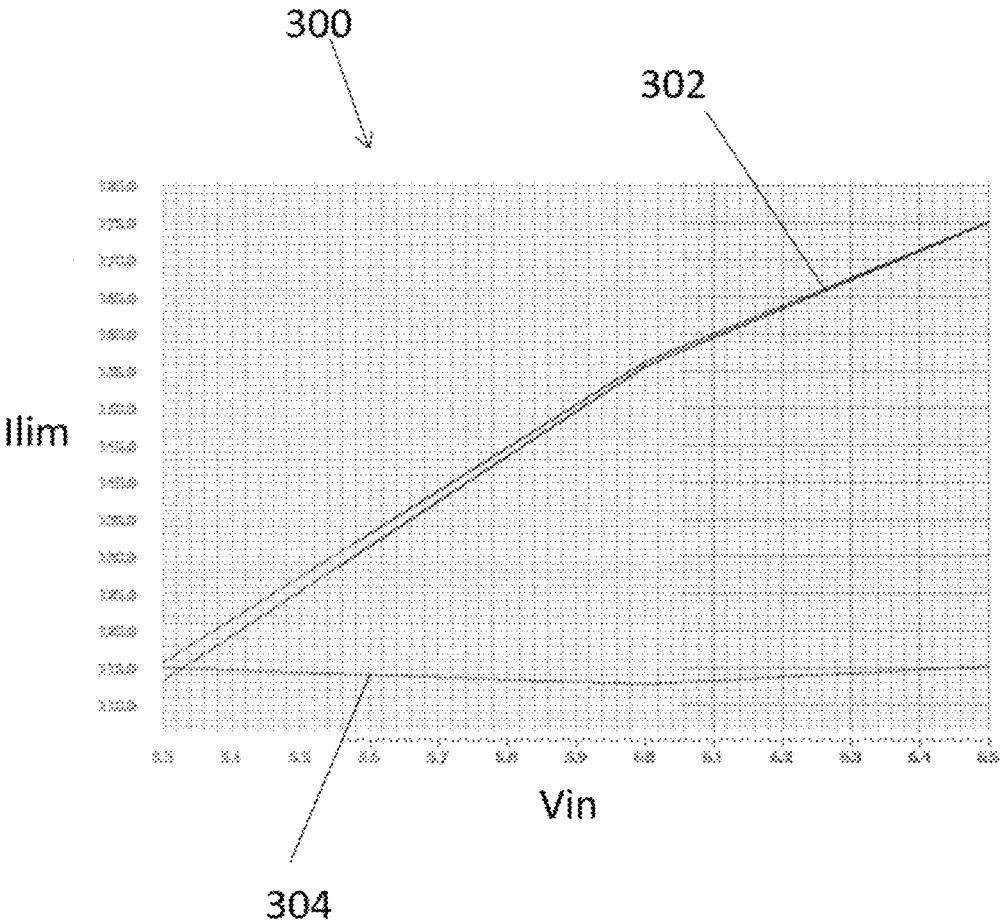
FIG. 10 depicts an example graph 300 of current limit threshold as a function of input voltage Vin for different charge pump regulators.

FIG. 10 depicts an example graph 300 of current limit threshold as a function of input voltage Vin for different charge pump regulators. For an application such as driving a typical LCD panel in a smartphone or tablet, an inverter charge pump with regulated Vout=−5V may be provided for a wide input voltage Vin range from 5.3V to 6.5V. A 80 mA current capability may be required. The current limit threshold may for example be set to around 110 mA to balance the current capability requirement and safe operation of internal devices of the smartphone. The Vds voltage may have a variation of 0.3V to 1.5V. The maximum variation of current limit threshold for previously known topologies (e.g. as shown in FIG. 1) may be 51% and 55% for the whole input voltage Vin range. For the proposed topology as described herein (e.g. in relation to FIGS. 2 and 3) may have a variation of only 2%. This variation is substantially smaller, illustrating a much more accurate (constant) current limit. The accurate current limit threshold may help to better protect internal devices. In another example (not shown) a commonly used doubler charge pump regulator with a regulated output voltage Vout=5V for a wide input voltage Vin range from 2.7V to 4.4V, the Vds may have a variation of 0.4V to 3.8V. Similar improvements in current limit accuracy may be observed in the doubler application compared to the inverter application.

The input voltage Vin as described herein may for example be in a range from 0 to 10V, from 1V to 5V, from 2.5V to 5V, or from 2.7V to 4.4V. The output voltage may be a regulated (i.e. approximately constant) value in a range from −10V to 10V.

The invention claimed is:

1. A current limiter for a charge pump regulator comprising:
   a sampling block configured to sample a first drain-source voltage of a first transistor and hold it as a reference drain-source voltage;
   an adaptive tracking block configured to receive the reference drain-source voltage and to generate a maximum voltage based on the reference drain-source voltage, so that the maximum voltage tracks the reference drain-source voltage;
   a voltage clamp block configured to clamp a feedback voltage to the maximum voltage, and to provide the clamped voltage as a first gate-source voltage of the first transistor (M0);
   wherein the charge pump regulator comprises a feedback loop comprising the first transistor for regulating a discharge current from the charge pump regulator;
   wherein the charge pump regulator is configured to convert an input voltage to an output voltage; and
   wherein the current limiter is configured to limit the current provided by the charge pump regulator.

2. The current limiter according to claim 1, wherein the adaptive tracking block comprises a sense transistor connected to a sense amplifier and connected to a reference current, and wherein the sense amplifier and the reference current are configured to clamp the drain-source voltage of the sense transistor to the reference drain-source voltage.

3. The current limiter according to claim 2, wherein the charge pump regulator has a current limit output that is based on a size ratio of the sensing transistor and the first transistor.

4. The current limiter according to claim 1, wherein the voltage clamp block comprises a clamp amplifier and a clamp transistor configured to receive the feedback voltage and the maximum voltage, to clamp output the feedback voltage clamped to the maximum voltage.

5. The current limiter according to claim 1, wherein the input voltage is in a range from 2.7 V to 4.4 V.

6. The current limiter according to claim 1, wherein the charge pump regulator is a pump selected from the group consisting of a doubler charge pump, a tripler charge pump, and an inverter charge pump.

7. The current limiter according to claim 1, wherein the output voltage (Vout) is a set value in a range from −10 V to +10 V.

8. The current limiter according to claim 2, wherein the voltage clamp block comprises a clamp amplifier and a clamp transistor configured to receive the feedback voltage and the maximum voltage, to clamp output the feedback voltage clamped to the maximum voltage.

9. The current limiter according to claim 2, wherein the input voltage is in a range from 2.7 V to 4.4 V.

10. The current limiter according to claim 2, wherein the charge pump regulator is a pump selected from the group consisting of a doubler charge pump, a tripler charge pump, and an inverter charge pump.

11. The current limiter according to claim 2, wherein the output voltage (Vout) is a set value in a range from −10 V to +10 V.

12. The current limiter according to claim 3, wherein the output voltage (Vout) is a set value in a range from −10 V to +10 V.

13. The charge pump regulator of claim 1 for converting the input voltage (Vin) to the output voltage (Vout), the charge pump regulator comprising:
    a switched-capacitor array configured to receive the input voltage and convert it to the output voltage;

an oscillator comprising a first clock signal and a second clock signal, wherein the first and second clock signals do not overlap and are configured to control the switched-capacitor array by generating a charge phase and a discharge phase;
    the feedback loop comprising a resistor divider, an error amplifier and the first transistor (M0); and
    the current limiter according to claim 1.

14. The charge pump regulator of claim 2 for converting the input voltage (Vin) to the output voltage (Vout), the charge pump regulator comprising:
    a switched-capacitor array configured to receive the input voltage and convert it to the output voltage;
    an oscillator comprising a first clock signal and a second clock signal, wherein the first and second clock signals do not overlap and are configured to control the switched-capacitor array by generating a charge phase and a discharge phase;
    the feedback loop comprising a resistor divider, an error amplifier and the first transistor (M0); and
    the current limiter according to claim 2.

15. The charge pump regulator of claim 3 for converting the input voltage (Vin) to the output voltage (Vout), the charge pump regulator comprising:
    a switched-capacitor array configured to receive the input voltage and convert it to the output voltage;
    an oscillator comprising a first clock signal and a second clock signal, wherein the first and second clock signals do not overlap and are configured to control the switched-capacitor array by generating a charge phase and a discharge phase;
    the feedback loop comprising a resistor divider, an error amplifier and the first transistor (M0); and
    the current limiter according to claim 3.

* * * * *